Figure 3:
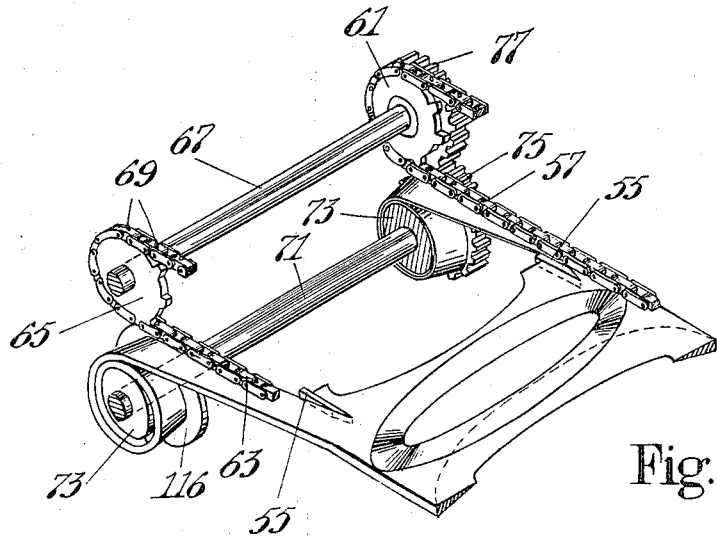

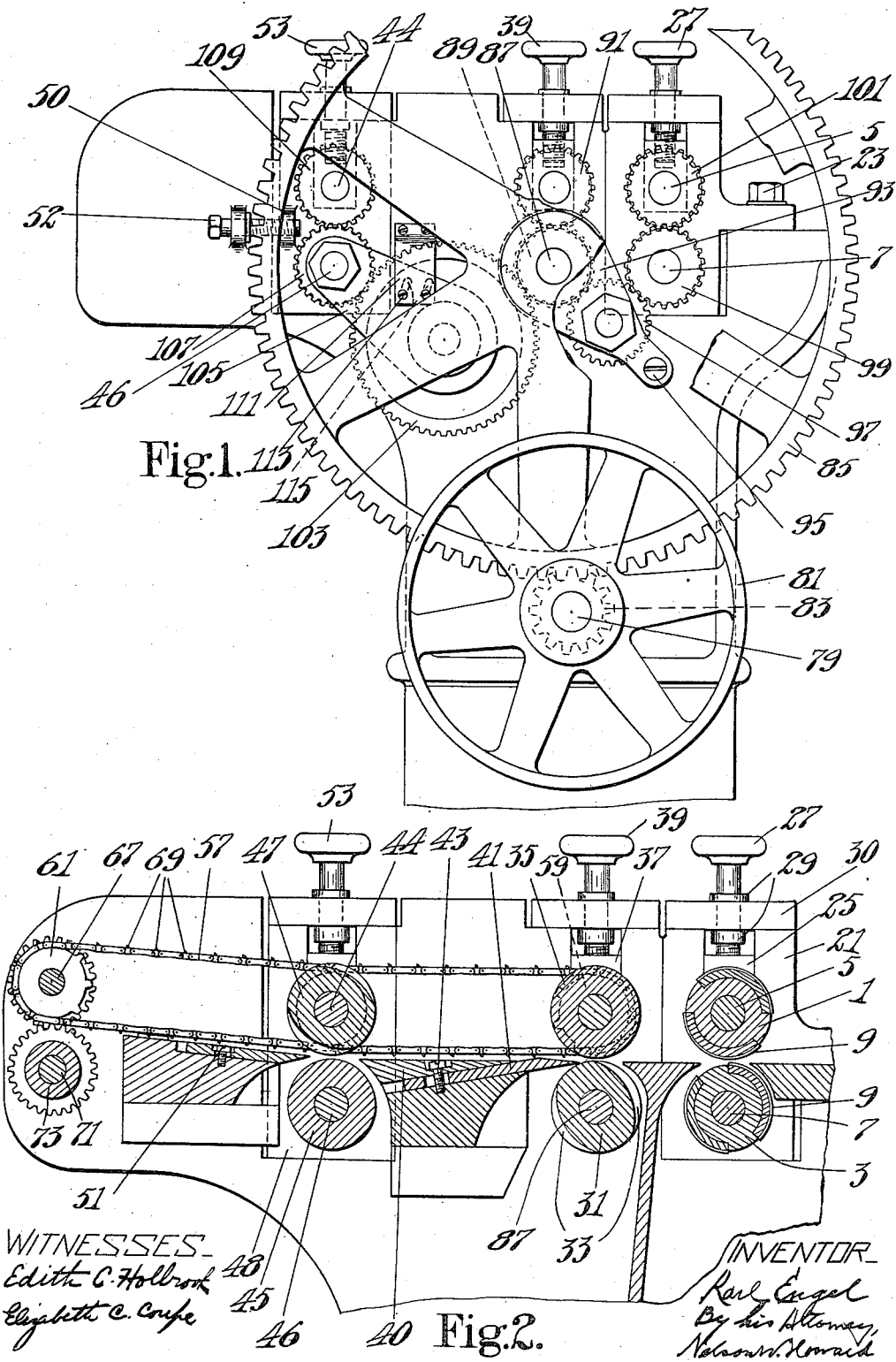

K. ENGEL.
MACHINE FOR CUTTING UP STOCK.
APPLICATION FILED OCT. 23, 1909.

1,068,490.

Patented July 29, 1913.
2 SHEETS—SHEET 2.

WITNESSES:
Edith C. Holbrook
Elizabeth C. Coupe

INVENTOR:
Karl Engel
By his Attorney
Nelson W. Kennard

UNITED STATES PATENT OFFICE.

KARL ENGEL, OF ARLINGTON, MASSACHUSETTS, ASSIGNOR TO UNITED SHOE MACHINERY COMPANY, OF PATERSON, NEW JERSEY, A CORPORATION OF NEW JERSEY.

MACHINE FOR CUTTING UP STOCK.

1,068,490. Specification of Letters Patent. Patented July 29, 1913.

Application filed October 23, 1909. Serial No. 524,179.

*To all whom it may concern:*

Be it known that I, KARL ENGEL, a citizen of the United States, residing at Arlington, in the county of Middlesex and State of Massachusetts, have invented certain Improvements in Machines for Cutting Up Stock, of which the following description, in connection with the accompanying drawings, is a specification, like reference characters on the drawings indicating like parts in the several figures.

This invention relates to a machine for cutting material into pieces the edges of which are beveled and particularly to a machine for cutting from stock certain parts used in the manufacture of boots and shoes in such a manner that the maximum amount of stock may be utilized.

For convenience the description will be limited to a machine for cutting counters and rands from leather stock, but it should be understood that the invention is in no way limited to the production of the articles named since similar articles, such as box toes for example, may be produced if desired, and that the nature of the stock from which such articles are cut is immaterial.

Hitherto in manufacturing counters it has been customary first to die out the blanks from the stock, next to run these blanks through a splitting machine in order to bring them to a uniform thickness, and finally to run them through a skiving machine in order properly to bevel their edges. The remnants of stock from the first operation consist of a number of small irregularly shaped pieces more or less connected by narrow strips; from the second operation of small thin pieces having the outline of the counters from which they were split; and from the third operation of pieces having the outline of the counter but being otherwise the reverse of the counter, that is, the edges are thick and gradually taper toward a hole in the center. The waste material from this procedure forms a large per cent. of the original stock, but because of the form in which it is left is useless for shoe manufactures and is practically unsalable.

The general purpose of this invention, therefore, is to reduce both the number of operations and the proportion of waste material.

Accordingly one object of this invention consists in the provision of means whereby a series of counters are dipped out of the stock each at a single operation; and preferably the mechanism is so timed that a certain extent of uncut stock is left between the cavities from which the counters of the series have been removed so that a second series of counters may be cut in any approved manner from the material which remains between the cavities caused by the removal of the first series. In this way the beveled edges of the counters, as they may be conceived to lie in the stock, overlap so that from a given amount of stock a greater number of counters are produced than was the case with the old method where each counter was first died out and then beveled. Conveniently this result may be attained by providing a plurality of coöperating rolls one of which is provided with a die cavity together with a knife in operative relation to the rolls and means for actuating the rolls.

In order to facilitate the removal of these two series another object of this invention consists in the provision of a plurality of reversely arranged dipping out mechanisms and means for actuating them, said mechanisms being so timed that one of them dips out from one side of the stock a series of similarly placed counters in such a manner that the distance between the cavities from which the counters have been removed is less than the width of the counters which are to be dipped out from the opposite side, while another mechanism dips out from this opposite side a second series of counters. This result may be accomplished in any convenient manner, and in the illustrated embodiment of the invention two dipping out mechanisms are shown. The first consists of a feed roll, a die roll and a knife arranged to operate from the under side of the stock as it passes through the machine, while the second consists of a mechanism identical with the first but reversely arranged so as to operate from the upper side of the stock.

It is desirable that the counters produced should be of a uniform contour, and it may be advantageous that their beveled edges should have an appreciable thickness. Accordingly a further object of this invention consists in the provision of means for outlining the counters. Conveniently this means may comprise a roll carrying an outlining knife or die the contour of which corresponds to that of the counters desired; and in the illustrated embodiment two such rolls are shown.

In order to promote still further utilization of stock another object of this invention consists in the provision of means for removing a rand from the stock which remains after the counters have been dipped out, and in the illustrated embodiment this means takes the form of a stationary knife, two of which are shown.

These and other objects of the invention will be explained in connection with the accompanying drawings and will be pointed out in the appended claims.

Figures 4, 5:
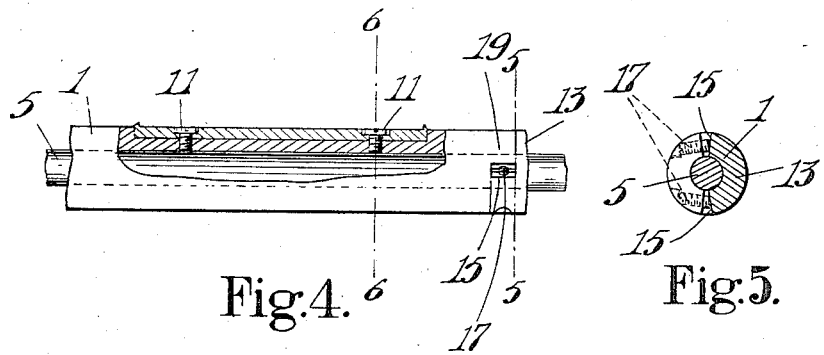
Figure 6:
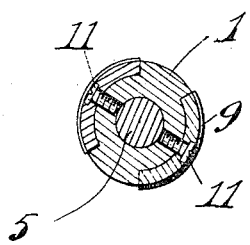

Referring now to the accompanying drawings:—Figure 1 is a side elevation of a machine in which the invention is embodied; Fig. 2 is a longitudinal vertical cross-section; Fig. 3 is a perspective in detail showing the knives in the process of separating the rands from the stock after the counters have been removed, one of the flanges which hold the rands on the rolls having been removed. Fig. 4 is an elevation of one of the outlining rolls; Fig. 5 is a cross-section on the line 5—5 of Fig. 4; and Fig. 6 is a cross-section on the line 6—6 of Fig. 4.

Before proceeding to a detailed description it may be stated that the illustrative machine comprises among other things a plurality of agencies as follows:—a pair of outlining members by which the two series of counters are outlined upon opposite sides of the stock; a plurality of reversely arranged dipping out mechanisms by which the outlined counters are removed from the stock; and a plurality of trimming devices by which a rand of approximately triangular cross-section is separated from each edge of the strip of stock.

Before feeding the stock to the machine it is preferably run through a splitting machine to reduce it to uniform thickness and then cut into strips of a width equal approximately to the length of the counters desired. These strips are then fastened together in any approved manner and the long strip thus produced is wound upon a drum (not shown) and the free end fed through the machine and attached to a second drum. By this arrangement the action of the machine may be rendered continuous so that it will require but little attention.

In the drawings the outlining members are shown as a pair of rolls 1 and 3 mounted upon two shafts 5 and 7, each roll carrying knives or dies 9 which correspond in contour to that of the counters desired, said dies being held in sockets in said rolls by means of screws 11. In Figs. 4, 5 and 6 one of these rolls is shown in detail, their construction being identical. To the shaft 5 is fixed a collar 13 having a shoulder 15, and against this shoulder abut a pair of screws 17, said screws being threaded through an extension 19 of the roll 1. With this construction it is possible to move the roll angularly about the shaft 5 a slight extent in order that the operation of the outlining dies may be nicely timed. The shaft 7 is mounted in bearings in a casting 21, said casting being held in place by a bolt 23 which passes through a slot (not shown) in an extension of said casting so that when said bolt is loosened the casting 21 may be adjusted horizontally. The shaft 5 is mounted in a bearing block 25 which is vertically adjustable in the casting 21 by means of a screw 27 threaded through a plate 30 into said block but held from longitudinal movement by collars 29, said plate being removably attached to said casting in any approved manner. The purpose of the vertical adjustment of the block 25 is to provide for different thicknesses of stock and rolls of different diameters, while that of the horizontal adjustment is to adjust the distance between the outlining mechanism and the dipping out mechanism (presently to be described) so that the two mechanisms may be properly timed. The necessity of providing for these adjustments will be clear when it is stated that in order to produce counters of different sizes and contours rolls of different diameters are used, and that if a larger counter, for example, is to be produced the distance between the outlining mechanism and the dipping out mechanism must be increased.

Two dipping out mechanisms are shown. The first comprises a lower die roll 31 provided with a plurality of cavities 33 which correspond to the shape of the counters which it is desired to dip out from the under side of the stock, and an upper feed roll 35 preferably formed of yielding material such as rubber. The upper roll is mounted in a bearing block 37 which is vertically adjustable by means of a screw 39. The dipping out knife 41 is adjustably held in position by means of a screw 43 which passes through a clamping plate 40 and a slot in said knife and is threaded into the frame of the machine. The second dipping out mechanism is similar to the first except that it is reversely arranged so as to operate from the upper side of the stock. To this end the feed roll 45 is placed below the die roll 47; and the knife, which is held in adjusted position by the screw 51, has its beveled portion on the under side. An adjusting screw 53 is provided to vary the distance between the bearings of the rolls; and in order to permit horizontal adjustment of the rolls the shafts 44 and 46 of said rolls are mounted in a casting 48 which is provided with a lug 50, while an adjusting screw 52 held from longitudinal movement is threaded through said lug.

After the counters have been outlined and then dipped out of the stock by the mechanism described above the strip will present the appearance shown in Fig. 3 wherein one of the upper series of cavities and part of two of the lower series are shown. It should be noticed that both series of cavities extend through the stock and that consequently there is left in the central region of the strip only a comparatively slight amount of waste material. At the very edges of the strip, however, owing to the well known thin beveled ends of counters there is left a considerable thickness of material, in fact at the extreme edges approximately ninety to ninety-five per cent. of the original thickness of the stock. The thickness of these edge portions of the stock, however, decreases rapidly toward the central region of the stock so that there exists at each edge a strip or rand of approximately triangular cross-section, said rand being attached by its thin portion to the flimsy central portion of the stock. To remove these rands a plurality of trimming knives 55 are carried by the frame of the machine.

It is clear that any stretching of the stock as it passes through the machine might interfere with the production of uniform counters, and in order to guard against such a possibility an endless chain 57 passes over two sprocket wheels 59 and 61 on one side of the machine while a second endless chain 63 is similarly mounted on the opposite side of the machine upon a sprocket wheel 65 fast to the shaft 67 and a sprocket wheel (not shown) which is driven from the shaft which carries the sprocket wheel 59. The links of these chains carry projecting teeth 69 which engage the stock as it reaches the first dipping out mechanism and remain engaged therewith during the operations which are carried out upon the stock.

In order to take care of the rands as they are removed by the knives 55 a shaft 71 mounted in bearings in the frame of the machine carries at each end a roller 73, a flange 116 being provided on each roller to guide the tapering rand as it is being wound. The shaft 71 also carries a gear 75 which meshes with the gear 77 on the shaft 67.

The driving mechanism comprises a main shaft 79 which carries a pulley 81 to which power is applied from any suitable source, said shaft also carrying a gear 83 which meshes with a large gear 85 fast to the shaft 87 of the roll 31. Fixed to this latter shaft is a gear 89 which meshes with a gear 91 said last named gear being fast to the shaft of the roll 35 and serving to drive the feed roll 35, the chains 57 and 63 and the shaft 71 through the connections shown. The shafts 5 and 7 of the outlining rolls are connected by gears 99 and 101, and in order to drive the gear 99 in any of its adjusted positions an arm 93 loose on the shaft 87 carries an intermediate gear 97 and is adapted to be held in adjusted position by means of a screw 95. The shafts 44 and 46 of the rolls 47 and 45 carry interengaging gears 109 and 107; and in order to drive the gear 107 there is rotatably mounted upon the shaft 46 an arm 105 carrying an intermediate gear 103 which is held in adjusted position by a plate 111 fast to the frame of the machine and provided with slots through which extend screws 113 which are threaded into said arm.

Whenever it becomes necessary to use rolls of a different diameter the roll shafts are removed from their bearings, said rolls being mounted in any conveniently removable manner, the old rolls replaced by new ones, and the shafts returned to place. The gears which drive said roll shafts must of course also be replaced by others of different diameter and the intermediate gears 97 and 103 adjusted about their pivotal mountings.

In operation, the proper rolls having been placed in position and adjusted to proper position and the knives and intermediate gears adjusted accordingly, power is applied to the pulley 81 and a strip of stock is fed to the machine, said strip being preferably unwound from a feeding drum (not shown) as it is advanced. The first set of rolls outline upon opposite sides of the stock two series of counters the individual members of which are alternately located; the dipping out mechanisms dip out the counters so outlined, and the trimming knives remove the rands which are automatically wound on the drums. It will thus be seen that the operation of the machine is continuous and that consequently very little attention from the operator is necessary.

From an inspection of Fig. 3 it will be understood that the beveled edges of the counters as they lie in the stock overlap so closely that there is left between the cavities caused by the removal of one series of counters an extent of stock approximately equal to the width of the thickest or uncut portion of the counters of the other series. In this way the greatest number of counters or similar beveled pieces may be cut from a given amount of stock, while by making use of a strip the width of which is approximately equal to the length of the desired counters and by providing the trimming knives the waste material is reduced to a minimum.

Although the invention has been set forth in connection with a particular machine it should be understood that nothing herein contained is to be construed as limiting the invention in the scope of its application to the particular machine shown and described.

The invention having been thus described what is claimed and desired to be secured by Letters Patent is:—

1. A machine for cutting from a strip of stock a plurality of beveled pieces having in combination dipping-out mechanism, outlining mechanism, and means for causing said mechanisms to act one after the other.

2. A machine of the class described having, in combination, means for outlining upon a strip of stock a series of pieces and means for dipping out the pieces so outlined.

3. A machine of the class described having, in combination, means for outlining upon a strip of stock a series of pieces, said means including a roll provided with an outlining member, and means for dipping out the outlined pieces.

4. A machine of the class described having, in combination, a pair of rolls one of which is provided with an outlining member, a second pair of rolls one of which is provided with a die cavity, a dipping out knife arranged in operative relation to said last named pair of rolls, and means for actuating said rolls.

5. A machine of the class described having, in combination, means for outlining upon a strip of stock a series of pieces, means for dipping out the pieces so outlined, and means whereby the distance between the outlining means and the dipping out means may be varied.

6. A machine of the class described having, in combination, a pair of rolls one of which is provided with an outlining member, a second pair of rolls one of which is provided with a die cavity, a dipping out knife arranged in operative relation to said last named pair of rolls, and means whereby the distance between the two pairs of rolls may be varied.

7. A machine of the class described having, in combination, a pair of rolls one of which is provided with an outlining member, a second pair of rolls one of which is provided with a die cavity, a dipping out knife arranged in operative relation to said last named pair of rolls, and means whereby the distance between any given roll and the other one of the pair may be varied.

8. A machine of the class described having, in combination, a plurality of reversely arranged dipping out mechanisms constructed to operate successively upon a piece of stock and means for actuating said mechanisms.

9. A machine of the class described having, in combination, a plurality of reversely arranged dipping out mechanisms constructed to operate successively upon a piece of stock, means whereby the distance between said mechanisms may be varied, and means for actuating said mechanisms.

10. A machine of the class described having, in combination, a pair of rolls one of which is provided with a die cavity, a second pair of rolls similar in construction but reversely arranged, a dipping out knife in operative relation to each pair of rolls, and means for actuating said rolls.

11. A machine of the class described having, in combination, a pair of rolls one of which is provided with a die cavity, a second pair of rolls similar in construction but reversely arranged, a dipping out knife in operative relation to each pair of rolls, means whereby the distance between the pairs of rolls may be varied, and means for actuating said rolls.

12. A machine of the class described having, in combination, an outlining mechanism, a plurality of dipping out mechanisms arranged to operate upon opposite sides of a piece of stock, and means for actuating said mechanisms.

13. A machine of the class described having, in combination, an outlining mechanism, a plurality of dipping out mechanisms arranged to operate upon opposite sides of a piece of stock, means whereby the distances between the several mechanisms may be varied, and means for actuating said mechanisms.

14. A machine of the class described having, in combination, means for dipping out from opposite sides of a strip of stock two series of beveled pieces and means for preventing said stock from stretching.

15. A machine of the class described having, in combination, means for dipping out from opposite sides of a strip of stock two series of beveled pieces and means for separating from the remaining stock a rand.

16. A machine of the class described having, in combination, means for outlining upon a strip of stock a plurality of pieces, and means for dipping out the pieces so outlined, said outlining means comprising a shaft, an outlining member mounted thereon and means whereby said outlining member may be angularly adjusted.

17. A machine of the class described having, in combination, a skiving knife, means for causing said knife to enter the face of a strip of stock in a direction oblique to the plane of said face, an outlining knife, and means for causing said outlining knife to enter the strip for a predetermined distance in a direction at right angles to the plane of said face.

18. A machine for cutting from a strip of stock a plurality of counters having a die roll provided with a plurality of die cavities of the shape of the counters to be produced, said cavities being slightly spaced, a pressure roll, a skiving knife mounted in coöperative relation with said rolls, means for actuating said rolls to bring said cavities into action successively and continuously whereby a series of beveled counters will be cut from said strip, in combination with outlining dies and means for causing said dies to enter the face of the strip at approximately right angles thereto.

19. The combination with a plurality of skiving means arranged to act upon the stock at an angle to the face thereof, and mechanism for feeding a strip of stock to said means successively, of a non-extensible member having provision for engaging said strip at closely adjacent points, and means for causing said member to travel with said strip from one stock treating means to another.

20. The combination with a plurality of skiving knives for acting successively upon a strip of leather or other extensible material of an endless chain having a series of teeth adapted to engage said strip successively adjacent one mechanism and to be disengaged therefrom adjacent another mechanism, and means for actuating said chain.

21. A machine for cutting from a strip of stock a series of pieces each having a continuously beveled edge comprising in combination a plurality of rolls one of which is provided with a die cavity corresponding in shape to that of the beveled piece desired, a knife coöperating with said rolls, means for actuating said rolls whereby said strip is fed to said knife and successively operated upon, and a knife arranged at an angle to said first named knife for trimming the edge of said strip.

In testimony whereof I have signed my name to this specification in the presence of two subscribing witnesses.

KARL ENGEL.

Witnesses:
  FRED. W. GUIBORD,
  ARTHUR L. RUSSELL.

Copies of this patent may be obtained for five cents each, by addressing the "Commissioner of Patents, Washington, D. C."